United States Patent [19]

Holm

[11] 4,087,264

[45] May 2, 1978

[54] METHOD AND APPARATUS FOR WEB TREATMENT

[75] Inventor: William J. Holm, Springfield, Vt.

[73] Assignee: Riggs & Lombard, Inc., Lowell, Mass.

[21] Appl. No.: 733,021

[22] Filed: Oct. 15, 1976

Related U.S. Application Data

[62] Division of Ser. No. 446,706, Feb. 28, 1974, Pat. No. 3,986,274.

[51] Int. Cl.$^2$ ............................................. B01D 51/00
[52] U.S. Cl. ....................................... 55/418; 55/466; 55/526; 55/465
[58] Field of Search ......................... 55/418, 462–465, 55/466, 526

[56] References Cited

U.S. PATENT DOCUMENTS

| | | | |
|---|---|---|---|
| 784,537 | 3/1905 | Bearss | 55/462 |
| 1,743,675 | 1/1930 | Jordahl | 55/525 |
| 2,961,064 | 11/1960 | Fisher | 55/466 |
| 3,063,220 | 11/1962 | Almquist | 55/462 |
| 3,528,218 | 9/1970 | Garrett et al. | 55/461 |
| 3,920,422 | 11/1975 | Pircon | 55/462 |
| 3,923,480 | 12/1975 | Visch | 55/465 |

FOREIGN PATENT DOCUMENTS

13,034 of 1902 United Kingdom .................. 55/462

*Primary Examiner*—Bernard Nozick
*Attorney, Agent, or Firm*—Morse, Altman, Oates & Bello

[57] ABSTRACT

A running textile web that has been subjected to soaking by a liquid such as a scouring solvent is carried between a suction box located adjacent one face of the web and a source of pressurized and relatively dry heated gas adjacent the other face thereof and opposite the suction box. The heated gas passes through the web and is drawn into the suction box, enhancing the amount of liquid removed at this stage and presenting the web into a drying stage with less entrained liquid than if the web were subject to the action of the suction box only. The amount of mechanical mist is kept to minimum within a closed scouring range by means of a closed loop between the suction box and a return conduit provided with a trap containing a batt of metallic wool. The liquid discharge from nozzles employed to uncurl the edges of the web is directed against shields also containing a batt of metallic wool to reduce bouncing, noise and mist generation.

2 Claims, 4 Drawing Figures

METHOD AND APPARATUS FOR WEB TREATMENT

This is a division of application Ser. No. 446,706, filed on Feb. 28, 1974, now U.S. Pat. No. 3,986,274, dated Oct. 19, 1976.

BACKGROUND OF THE INVENTION

1. Field of the Invention

This invention relates generally to the processing of textiles and more particularly is directed towards a new and improved method and apparatus for removing liquid, such as a scouring solvent, from a running web. This invention relates to means for controlling the level of mist in a closed chamber such as a solvent scouring apparatus.

2. Description of the Prior Art

In my U.S. Pat. No. 3,771,952 as in my co-pending applications, Ser. No. 207,430, filed Dec. 13, 1971, entitled "Method & Apparatus For Cleaning Fabric" and in Ser. No. 240,602, filed Apr. 3, 1972, for "Fabric Treatment Apparatus" there are shown machines for scouring textiles on a continuous basis wherein the web is carried first through a wetting state in which it is scoured by liquid solvent to remove impurities. Once the scouring operation is finished, the web is carried over a suction box to remove some of the scouring liquid and thence it is transferred to a drying chamber wherein the remaining solvent in the web is removed. While the method and apparatus disclosed in the patent and the co-pending applications produce satisfactory results it has now been found that the web may be dried more quickly and with reduced drying facilities if a greater portion of the liquid is removed from the web prior to entering the drying chamber. It has also been found that this drying is enhanced if the amount of the chemical mist within the enclosed scouring chamber is kept to a minimum.

Accordingly, it is an object of the present invention to provide an improved method and associated apparatus for reducing the amount of liquid in a web that has been soaked prior to delivering the same to a drying stage. Another object of the invention is to provide an improved method and associated apparatus for reducing the amount of mechanical mist distributed within a closed chamber of a scouring range or the like.

SUMMARY OF THE INVENTION

This invention features the method of removing liquid entrained in a running web comprising the steps of applying a suction to one side of said web while simultaneously applying a heated and relatively dry gas to the opposite side of said web. Recirculated liquids and vapors are passed through batts of metallic wool in order to reduce mechanical mist within the atmosphere of the chamber. This invention also features an apparatus for enhancing removal of liquid from a saturated web, comprising a suction box mounted adjacent one face of the running web and a conduit mounted in closely spaced parallel relation to the suction box and on the opposite side of the web with the conduit connected to a source of heated gas. The conduit is formed with a slot facing opposite the slot of the suction box whereby the heated gas will be fed under pressure out through the conduit slot, through the web and drawn into the slot of the suction box.

DETAILED DESCRIPTION OF THE PREFERRED EMBODIMENT

Figure 1:
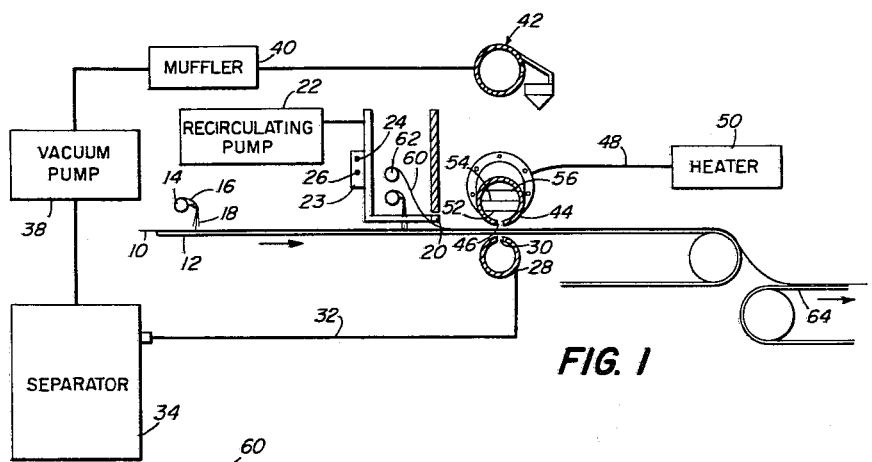
FIG. 1 is a fragmentary view in side elevation, somewhat schematic, of an apparatus made according to the invention.

Referring now to the drawings and to FIG. 1 in particular, there is illustrated, somewhat schematically, a system made according to the invention for carrying out the steps of the invention. As shown, a web 10 either is an open width or flat tubular condition is carried by a foraminous conveyor belt 12 first through a wetting stage wherein the web is soaked as by a liquid scouring solvent discharged from one or more spray bars 14 disposed about the upper reach of the belt 12. In practice, the spray bars 14 are in the form of tubes extending transversely above the conveyor 12 and formed with spaced orifices directed against an arcuate baffle 16 which converts the jets from the nozzles into a continuous sheet 18 of liquid deposited over the web 10 traveling underneath.

Figure 4:
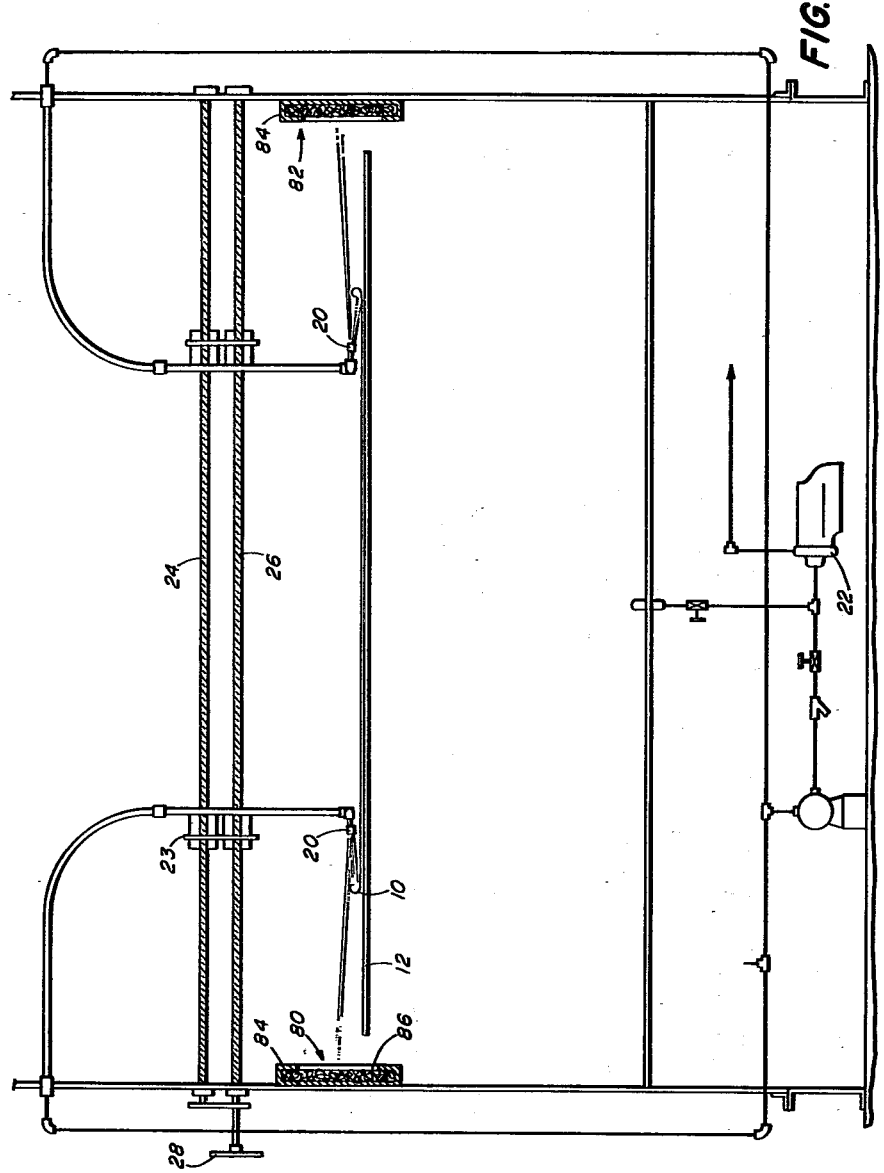

The edges of the web 10 may tend to curl inwardly, particularly if the web being processed is knit material. In order to insure that the scouring action is directed onto the edges of the web a pair of adjustable nozzles 20 is mounted in closely spaced relation above the belt 12 and web 10 adjacent the edges thereof. The nozzles 20 are directed outwardly and slightly downwardly towards the curled web edges as best shown in FIG. 4. The nozzles 20 are connected to a recirculating pump 22 which delivers a continuous flow of scouring liquid under pressure which is directed against the curled web edges causing them to uncurl and flatten down against the belt. The nozzles 20 are carried by brackets 23 each engaging a traverse mechanism comprised of lead screws 24 and 26 under the control of a crank 28. Operation of the crank will turn the lead screws causing the brackets 23 and their nozzles 20 to move in and out from the center line of the belt in order to accommodate for webs of different widths processed by the apparatus.

From the scouring stage the conveyor belt 12 carries the web 10 over a suction box 28 adapted to remove a substantial portion of the liquid contained in the web. The suction box 28 typically is in the form of a tubular conduit having a restricted slot 30 extending substantially full length of the suction box 28 which is disposed transversely under the upper reach of the belt 12. Typically the suction box slot 30 is on the order of 3/32 inch in width and is connected by a conduit 32 to a separator 34 wherein most of the liquid state solvent removed from the suction box is collected. The separator, in turn, is connected by a conduit 36 to a vacuum pump 38 discharging through a muffler 40 into a return conduit 42 disposed above the conveyor 12. Using the suction box only to remove the liquid solvent from the web, approximately 65% (by weight) of the scouring liquid remains in the web after it has passed over the vacuum slot. Prior to passing over the slot the web may contain on the order of three times its weight in liquid. Insofar as the web must be thoroughly dry before it can be removed from the apparatus and because of the cost of the solvent, it is desirable to recover virtually all of the solvent, and to dry the web as quickly as possible.

In accordance with the present invention, the amount of liquid removed from the web is substantially increased by directing a continuous flow of heated and relatively dry gas, preferably solvent vapors, against the web 10 directly opposite the slot 30 of the vacuum box 28. This measure provides a more positive drying action on the web since the concentrated flow of dry gas through the web and into the suction box causes more of the entrained liquid in the web to be removed than would occur from the operation of the suction box alone. In practice, using only a suction box, the vacuum draws in liquid from the web as well as cool, moist vapors normally present in the vicinity of the web adjacent the box.

Figure 2:
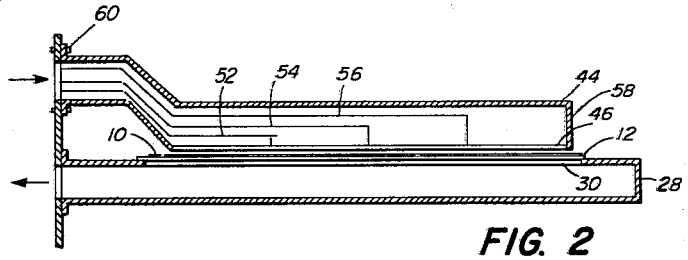
FIG. 2 is a sectional end view of the suction box and hot gas conduit of FIG. 1.

As best shown in FIGS. 1 and 2, the stream of hot, dry vapor is directed against the web and into the suction box by means of a distributing tube 44 mounted in closely spaced relation to the upper face of the web 10 and conveyor 12 and in directly opposite parallel relation to the suction box 28. The tube 44 is formed with a sot 46 aligned with the suction box slot 30. Typically, the distributing tube slot 46 is on the order of ⅛inch in width to insure that the narrower slot of the suction box slot 30 is spanned to draw in hot, dry vapor discharged from the tube 44 with a minimum amount of moist, cool vapor.

The tube 44 is connected by a conduit 48 to a heater 50 in which solvent vapors from the drying section of the range are heated to an elevated temperature, typically on the order of 270° to 280° F. In any event, hot, dry vapor is pumped under pressure by a heater fan through the conduit 48, through the wall of the range housing and into the distribution tube 44 where it is discharged through the slot 46.

In the preferred embodiment, the tube 44 is cantilevered from the side wall of the housing and is formed with a plurality of internal baffles 52, 54 and 56 originating at the entrance of the tube at the side wall and extending to the slot 46. The baffles are spaced from one another in parallel relation to terminate in staggered relation across the slot as a means for insuring even distribution of the heated vapors delivered therethrough. It will be understood that if the baffles were not provided, the flow of heated gas would tend to be greater near the left-hand end of the tube 30 with a reduced flow at the righthand end. The right-hand end of the tube 44 terminates in an end wall 58 while the opposite end of the tube may be connected to the housing wall by means of bolts 60 passing through slots formed in the wall of the range and the wall of a tube flange. In this fashion, the tube may be raised or lowered in order to change the clearance between the slot 46 and the web and belt.

In order to maximize the efficiency of the suction box, a pair of imperforate tapered curtains 60 as disclosed in my copending application Ser. No. 240,602 may be employed to mask the outer ends of the sucton box slot 30 not covered by the web 10. In this fashion, the suction box will draw only through the web and not through the slot ends that would otherwise be exposed by a narrow web. The curtains 60, as shown in the co-pending application Ser. No. 240,602 are wound on a reefing roller 62 and by rotation thereof the curtains may be drawn in or extended depending upon the width of the web being processed.

By passing the web between the distribution tube and the suction box, more of the solvent entrained in the web is removed than by the action of the suction box alone and, in practice, the web leaving the area of the suction box and distribution tube will contain perhaps 50% solvent (by weight) as opposed to the normal 65% where the suction box only is used. This means that the drying chamber will have to remove less solvent than would otherwise be the case. This reduction in the amount of solvent in the web, as it is introduced to the drying chamber, reduces the load on the drying chamber so that the size may be reduced or its speed increased with an accompanying reduction in the residence time of the web in the drying chamber.

From the suction box and distribution tube the web, carried by the belt 12, is transferred onto a synchronized conveyor 64 which is located in the drying chamber and, as shown in my copending application, may comprise a series of conveyors which carry the web back and forth through a heated atmosphere which causes the remaining solvent entrained in the web to be flashed off. The system essentially is a closed loop arrangement in which the solvent is continuously recycled and care is taken to prevent loss of solvent from the system.

Figure 3:
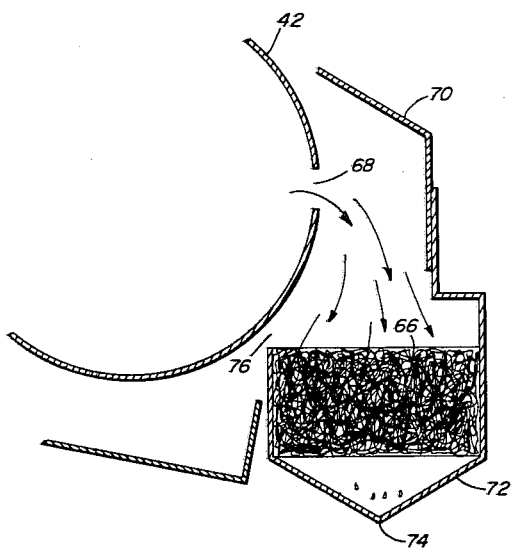
FIG. 3 is an enlarged, detailed, cross-sectional view of the vapor return trap of FIG. 1, and, FIG. 4 is a sectional view in elevation somewhat schematic, of the jet openers and shields made according to the invention.

Since it is desirable to keep the atmosphere with the chamber, especially beyond the wetting section, as dry as possible means are provided to reduce the amount of mechanical mist developed beyond the wetting section. This is accomplished by means of the return conduit 42, in FIGS. 1 and 3. The conduit 42 as previously indicated, receives the discharge of the vacuum pump which, when it is fed into the conduit 42, is primarily a mechanical mist being highly saturated and containing a large percentage of liquid droplets. The mechanical mist is converted into a more vapor state by passing it through a bed of metallic wool 66 before returning it to the chamber. As best shown in FIG. 3, the conduit 42 is formed with a slot opening 68 in the side thereof through which the mechanical mist is discharged into a channel formed by a shed baffle 70 supporting a trough 72 suspended therefrom below the slot 68. The trough is formed with a V-shaped base 74 and a mid-portion filled with the bed 66 of metallic wool, preferably stainless steel wool. It will be noted that the left-hand edge of the trough is spaced from the conduit 42 to form a clearance 76. In practice, the mechanical mist delivered from the slot 68 first passes down through the bed of wool 66 which causes a large portion of the mist to condense. The condensate passes through the wool and collects in the V-shaped base where it is drained off at either end and collected in the drain return system of the apparatus, The mechanical mist is thus converted into a drier condition, being primarily vapor which then passes out through the clearance 76 and into the chamber.

The amount of mechanical mist is also reduced by means of shields 80 and 82 (FIG. 4) mounted on the side walls of the range housing oppositely the uncurling nozzle 20. Each shield is comprised of a holding frame 84 mounted directly to the housing wall and supporting a batt 86 of metallic wool, preferably stainless steel wool. The frame 84 and batt 86 are disposed to extend above and slightly below the level of the belt 12 and web 10 and in register with the discharge of the nozzles 20. In this fashion the jets from the nozzles, after uncurling the web edges, will strike against the batt 86 of metallic wool, effectively reducing the amount of mechanical mist generated. If the jets were directed against a hard, flat wall, the jets would bounce against the wall, atomizing the liquid and causing a high level of mechanical mist to be developed. Further, the jets would produce a substantial amount of noise as they strike the wall. By using a batt of metallic wool not only is the noise level substantially reduced but the action of the wool with the jets, greatly reduces the amount of mechanical mist developed. The solvent from nozzles remains mostly liquid and is collected by the drain system of the apparatus.

Having thus described the invention what I claim and desire to obtain by Letters Patent of the United States is:

1. Apparatus for reducing the amount of mechanical mist in a closed chamber adapted to scour a running fabric web with a solvent and employing a vacuum pump for recovering said solvent, comprising
   (a) a tubular conduit mounted horizontally in said chamber and connected to the discharge of said pump,
   (b) said conduit being formed with a horizontal slot opening along a side thereof and communicating with said chamber,
   (c) an elongated trap including a shed baffle defining a channel mounted horizontally in close proximity to said opening and coextensive therewith to receive the discharge therefrom,
   (d) said trap including a trough extending lengthwise of said conduit below said slot opening and spaced from the conduit to form a clearance,
   (e) said trap being formed with an opening to said chamber, and,
   (f) a quantity of metallic wool mounted in said trap in the path of the discharge and above said trough.

2. Apparatus according to claim 1 wherein said wool is stainless steel.

* * * * *